Figure 1:
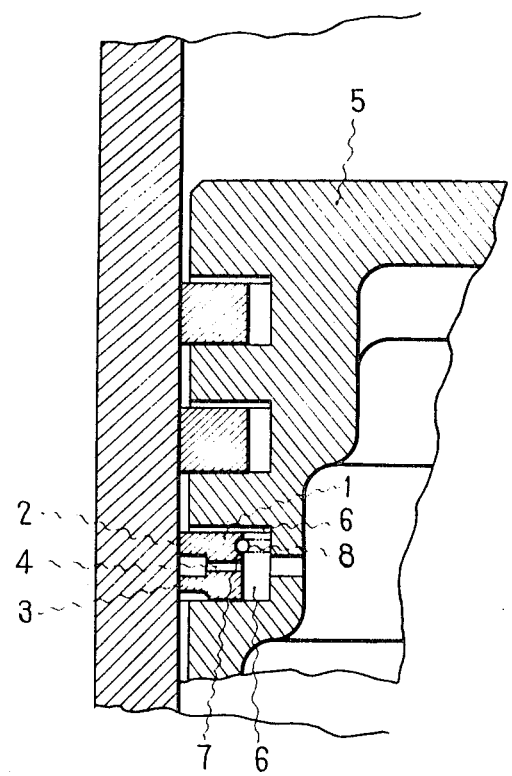

United States Patent

[11] 3,623,739

| | | | |
|---|---|---|---|
| [72] | Inventor | Eisuke Sugahara Tokyo, Japan | |
| [21] | Appl. No. | 889,228 | |
| [22] | Filed | Dec. 30, 1969 | |
| [45] | Patented | Nov. 30, 1971 | |
| [73] | Assignee | Nippon Piston Ring Kabushiki Kaisha Tokyo, Japan | |
| [32] | Priority | Feb. 17, 1969 | |
| [33] | | Japan | |
| [31] | | 44/11055 | |

[54] OIL SCRAPER RING
1 Claim, 3 Drawing Figs.

[52] U.S. Cl. .................................................. 277/163, 277/75
[51] Int. Cl. ...................................................... F16j 9/20
[50] Field of Search ............................................ 277/163, 139, 140, 143, 76, 75, 78, 157

[56] References Cited
UNITED STATES PATENTS
3,066,943 12/1962 Brenneke ..................... 277/139

Primary Examiner—Robert I. Smith
Attorney—Kelman and Berman

ABSTRACT: An oil scraper ring for the piston of an internal combustion engine which has two axially spaced outer, approximately cylindrical faces and an oil window radially therethrough between the faces is provided with an expander in an annular groove of the inner circumferential face radially approximately aligned with one of the outer faces which is axially wider than the other outer face for uniform pressure distribution between the two faces.

PATENTED NOV 30 1971

3,623,739

INVENTOR.

Eisuke Sugahara

BY: Kelman and Berman
AGENTS

OIL SCRAPER RING

This invention relates to an oil scraper ring for a piston in an internal combustion engine, and more particularly to improvements in an oil scraper ring having a coil expander.

Known in the art and widely used in internal combustion engines are rings which scrape off the excess oil deposited on the cylinder wall. Such a known oil scraper ring has an upper cylindrical sliding face and a lower cylindrical sliding face, which are of the same size, and has an oil window between the faces. The ring is fitted into a ring groove on a piston and the coil expander is secured in a groove on the backside of the ring.

However, when the scraped off oil flows through the oil window and the coil expander toward the oil hole in the piston, the carbon residues in the oil tend to cause loading of the coil expander, which ultimately results in forcing the oil to flow out from space between the cylinder wall and the ring with resultant increase of oil consumption and also impaired function of expander.

This is ascribable to the arrangement of the coil expander in the axial center of the ring in such a manner as to intercept the oil.

In an attempt to overcome such defect, there was proposed an improved oil scraper ring (U.S. Pat. NO. 2,439,702) where the coil expander is not aligned with the oil window. In this type of oil scraper ring, however, the surface pressures exerted on the upper sliding face and the lower sliding face of the ring by the expander are due to the axially asymmetrical position of the coil expander, resulting in distortion of the oil scraper ring, and cooperation of both sliding faces with the cylinder wall is disrupted, so that consumption of the oil is increased. The upper sliding face is subjected to substantially the entire force of the coil expander in addition to the resiliency of the known ring, while the lower sliding face is almost unaffected by the coil expander, and this causes distortion of the ring section.

According to the present invention, distortion of the oil scraper ring, avoided by partly cutting away one of said sliding faces axially opposite from the coil expander relative to the oil window thereby to reduce the area of the lower sliding face.

Figure 2:
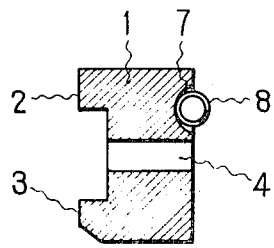
Figure 3:
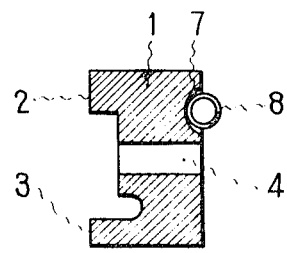

FIG. 1 of the drawing is a fragmentary cross-sectional view of an internal combustion engine equipped with an oil scraper ring according to the present invention; and FIGS. 2 and 3 are corresponding views of modified rings of the present invention.

The oil scraper ring according to the present invention comprises a ring body (1) having an upper sliding face (2) and a lower sliding face (3) and formed with an oil window (4), said ring body (1) being fitted in a ring groove (6) in a piston (5), and a coil expander (8) is mounted in an annular groove (7) of semicircular cross section on the backside of the ring body. The coil expander (8) is offset from the axially median plane of the ring through the window 4 toward the upper side or the sliding face, and an area equivalent to the amount of distortion produced on the ring by such offset is cut out from the lower sliding face on the side opposite from the coil expander (8) so as to equalize the surface pressures on both sliding faces, thereby to prevent distortion of the oil scraper ring by the asymmetrically arranged coil expander.

The rings shown in FIGS. 2 and 3 differ from that seen in FIG. 1 by the shape of their lower halves. The axially narrower, lower sliding face 3 is axially farther from the window 4 in the ring of FIG. 2 than in that shown in FIG. 1, and at the far axial end of the ring in FIG. 3.

Because the coil expander is offset axially from the oil window, the lubricating oil flows smoothly without loading the coil expander, yet, there is no distortion of the oil scraper ring.

The sliding faces can be machined with ease, so that the manufacture of the ring is also easy.

When a cut is formed in the lower sliding face, a sharp edge is formed at the cutout which enhances the scraping effect of the ring.

While, in the foregoing, the invention has been described with reference to preferred embodiments, it will be obvious to those skilled in the art that various changes and modifications may be made therein without departure from the spirit and scope of the invention as recited in the appended claim.

What is claimed is:

1. An oil scraper ring comprising:
   a. a ring body having an axis and two outer, axially spaced, substantially cylindrical sliding faces of equal diameter,
      1. said body being formed with an oil window radially extending therethrough axially intermediate said faces and with an annular circumferential groove about said axis in the inner surface of said ring,
      2. said groove being axially offset from said window; and
   b. an expander received in said groove in approximate radial alignment with one of said sliding faces,
      1. the other sliding face being smaller in area and of smaller axial width than said one face.